United States Patent Office 2,785,069
Patented Mar. 12, 1957

2,785,069

METHOD OF MAKING HIGH-PROTEIN FOOD PRODUCTS

Ruth K. Dudman, Chicago, Ill., assignor to Swift & Company, Chicago, Ill., a corporation of Illinois No Drawing. Application October 5, 1953, Serial No. 384,351

4 Claims. (Cl. 99—14)

The present invention relates in general to the treatment of edible protein material preparatory to forming the same into food products. This invention represents an improvement over the methods disclosed and claimed in the earlier-filed applications of Robert A. Boyer, Serial No. 118,445, entitled "Synthetic Meat," filed September 28, 1949, and now abandoned; and in the continuation-in-part thereof, Serial No. 286,447, filed May 6, 1952, now Patent No. 2,682,466; as well as in the Boyer application Serial No. 334,649 entitled "High Protein Food Products," filed February 2, 1953, now Patent No. 2,730,447; and the Boyer, et al. application Serial No. 334,757, entitled "Imitation Meat Products (pH Control)," filed February 2, 1953, now Patent No. 2,730,448.

Many efforts have heretofore been made to develop a satisfactory meat substitute which would simulate meat as to the texture, flavor, and appearance thereof. As disclosed in the afore-mentioned, earlier-filed applications, a completely satisfactory meat substitute may be prepared from edible protein material such as soybeans, corn or peanut proteins as well as from animal proteins such as casein. These protein materials, in accordance with the methods in such applications, are produced in the form of fibers or filaments which are coagulated in a suitable bath and stretched by means of a series of rolls revolving at increasing speeds. The filaments are then placed in a salt solution (such as sodium chloride) of sufficient concentration to prevent the filaments from redissolving. Groups of these filaments, in accordance with the methods disclosed in said earlier-filed applications, are formed into bundles or tows and then freed from excess liquid by squeezing or centrifuging. The bundles of filaments are then mixed with a suitable edible binder, for example, a cereal binder or edible protein binder. The individual groups of filaments may then be assembled into a tow and passed through a bath of melted fat or the like, or alternatively the fat may be added to the spinning solution prior to the formation of the filaments. Different characteristics may be imparted to the final product by varying the steps leading up to the end product. For example, varying the pressure in assembling the final tow will vary the density and texture of the final product. Likewise varying the method of coating the protein filaments will produce different effects. The toughness or tenderness of the resulting product can be controlled to some extent by the amount of stretch which is imparted to the filament in the initial forming procedure. This stretching results in an orientation of the molecules in the protein fibers and, as a general rule, will run from about 50 percent to about 400 percent stretch. The actual formation of the synthetic meat product is not considered to be a part of the present invention and has been described supra solely as an aid in understanding the problems met by the present invention.

In the production of synthetic meat as discussed above, or in the production of other food products in a similar manner, it has heretofore been considered necessary to utilize an extraneous binding agent to keep the fibers assembled in bundles or groups. Although cereal and animal proteins, gums, etc., have been used somewhat successfully, it would be desirable to eliminate the use of such binders altogether.

Accordingly, it is an object of the present invention to provide a method for preparing food products from man-made, edible protein fibers without the use of extraneous binders.

It is an additional object of the present invention to utilize the protein fibers themselves as the binding agent in food products prepared from man-made, edible protein fibers.

Additional objects, if not specifically set forth herein, will be readily apparent to one skilled in the art from the following detailed description of the invention.

Generally the present invention comprises the subjection of edible, man-made protein fibers to the action of heat alone whereby the fibers will fuse together.

More specifically, the present invention comprises the treatment of edible protein fibers, which have been adjusted to the proper pH, salt concentration, and moisture content, with controlled heat to obtain a binding action attributable solely to the protein fibers themselves. The following brief description of the formation of edible protein fibers from the original dispersion is given for the purpose of illustration only.

The protein fibers or filaments are preferably produced by dispersing the proteins which are the starting material in a suitable dispersing medium such as an alkaline solution. Actually, depending upon the material dispersed and the dispersing agent used, the dispersion may amount to a colloidal solution and it will be understood that the use of either term in the claims is inclusive of the other. It is often desirable to incorporate additives uniformly within the protein fibers or filaments and this may be done as described in the afore-mentioned application S. N. 334,649 by incorporating in such dispersion suitable additives or modifying agents such as cod-liver oil, salad oil, spice oils, skim milk solids, sugar, hydrogenated vegetable or animal oil shortening, lard, cottonseed oil, butter, mono-sodium glutamate, protein hydrolysates, spices, gums, flavoring agents, pigments or dyes. The amounts of these additives may vary from a barely distinguishable trace up to and including the maximum amount capable of inclusion within a particular protein fiber. This dispersion, with or without modifying agents incorporated therein, is then forced through a porous membrane, such as spinneret used in the production of rayon, into a coagulating bath which is generally an acid-salt bath solution. The streamlets coming through the spinneret are thus precipitated into the form of filaments. The filaments issuing from the spinneret, which actually is a small die having from perhaps five thousand to fifteen thousand holes each on the order of about 0.003 inch in diameter, will be of a diameter of about 0.003 inch. Following the formation of the protein material into filaments or fibers, the fibers may be subjected to a stretching operation of the degree hereinbefore described. Any suitable means for performing this stretching as by revolving rolls or the like may be used. Additionally, it may be desirable to subject the fibers to a mild heat treatment during or after such stretching. The stretched fibers or filaments are then placed in a salt solution (such as sodium chloride) having a concentration of 2 percent to 12 percent. It may well be desirable at this point in the process to adjust the pH of the fibers to within the range 4.0–7.0 by the use of an alkaline media as described in application S. N. 334,757. Any suitable alkali which can safely be used in food products is satisfactory for this purpose. Groups of these fibers are then formed into bundles or tows and freed from excess liquid by squeezing, centrifuging or the like. At this point in the process, it has heretofore been considered necessary to add a suitable binder to the bundles or man-made, edible protein fibers, whereupon the bundles or tows were then passed through a bath of melted fat or the like and then incorporated into the final product.

In accordance with the present invention, it has been found that the use of extraneous binders such as cereals or the like can be dispensed with if the fibers are subjected to a heat treatment suitably high to cause fusion thereof. Upon cooling, the fibers will be found to be bound together in a desirable fashion. Prior to the heating step, it is usually desirable to have the fibers in their proper condition for inclusion in the ultimate product, i. e., the salt concentration, moisture content and pH should be adjusted prior to the heat-binding treatment and modifying agents such as flavoring ingredients, dyes, etc., added. The temperature at which the binding operation is carried out will vary depending upon the particular type of protein being treated. For example, fibers prepared from casein, which should have a pH of about 5.2, a salt concentration of from 2 percent to 12 percent and a moisture content of 30 percent to 70 percent, must be heated to an internal temperature of 100° F. or higher for from 5 to 60 minutes. The temperatures required for the fusion of soybean fibers are somewhat higher, i. e., about 110° F. or higher, and generally a longer period of heating is required. The maximum temperatures which can be used will vary, depending on the protein, thickness of the tow, etc., but will generally not exceed a temperature which will produce other undesirable effects, e. g., burnt flavors, etc.

In carrying out the method of the present invention, the fibers may be fused in a number of different ways. The preferred method involves disposing the bundles of fibers on a rack in an uncovered vessel and heating in a 185° F. oven or higher until the fibers fuse together. Alternatively, the fusing may be effected by braising (oven heating with liquid in a covered vessel), broiling, infrared heating and steaming. Although the use of pressure is not necessary to effect fusion of the fibers, the heating may be carried out under pressure and produce satisfactory results, e. g., in a pressure cooker under one pound pressure or more.

The length of the heating step required to effect fusion is dependent upon several factors such as the temperature used, the type of protein fiber and the size of the bundle of fibers. For example, using the preferred method of oven heating in a 185° F. oven, a ¾ inch diameter bundle of casein fibers will require about 45 minutes of heating while a 1¾ inch diameter bundle of the same fibers will take about one hour to fuse. Under these conditions, a ¾ inch diameter bundle of soybean fibers requires about 1½ hours of heating and a 1¾ inch diameter bundle of the same fibers requires about 2 hours heating. Increasing the oven temperature to 240° F. will decrease the time of heating necessary for the ¾ inch bundles to about 30 minutes for the casein fibers and about one hour for the soybean fibers.

The following specific examples are merely illustrative of the varying temperature-time conditions at which the method of the present invention may be carried out, and are not to be construed as placing any limitation upon the scope of this invention other than as stated in the appended claims.

Example I

Casein fibers, prepared as described above, were adjusted by washing to a pH of 5.2 and a salt concentration of 3 percent. Excess moisture was removed from the fibers by squeezing. One hundred grams of these fibers were then shaped into a bundle 1 inch in diameter. This bundle was then placed on a rack in an uncovered pan in a 185° F. oven. One hour of heating at this temperature produced the desired amount of fusion of the fibers. A similar run in a 240° F. oven required ½ hour of heating to produce fusion.

Example II

Soybean fibers, prepared in the same manner as the casein fibers of Example I, i. e., with a pH of 5.2 and a salt concentration of 3 percent, were squeezed to remove excess moisture. One hundred grams of these fibers were shaped into a 1 inch diameter bundle and placed on a rack in an uncovered pan in a 185° F. oven. Fusion required 2 hours of heating at this temperature. A similar run in a 240° F. oven required 1 hour of heating to produce fusion.

Obviously, many modifications and variations of the invention as hereinbefore set forth may be made without departing from the spirit and scope thereof, and therefore only such limitations should be imposed as are indicated in the appended claims.

I claim:

1. In the manufacture of synthetic food products from edible man-made protein fibers the improvement which comprises: forming a bundle of such fibers, which fibers are free from extraneous binders; subjecting said fibers to the action of heat and external pressure; and continuing the influence of said heat and said pressure until fusion of said fibers and said bundle takes place.

2. The method of binding edible man-made protein fibers together which comprises: forming a bundle of such fibers; subjecting said bundle to the action of heat; and continuing the heating until fusion of said fibers in said bundle takes place.

3. The method of binding edible man-made protein fibers together which comprises: forming a bundle of such fibers; subjecting said fibers to an internal temperature of at least about 100° F.; and continuing the heating until fusion of said fibers and said bundle takes place.

4. The method of binding edible man-made protein fibers together which comprises: forming a bundle of such fibers; subjecting said fibers to an internal temperature of at least 100° F.; and continuing the heating for a period between about 5 minutes and about 2 hours.

References Cited in the file of this patent

UNITED STATES PATENTS 2,560,621    Wrenshall             July 17, 1951